United States Patent
Zhao et al.

(10) Patent No.: US 9,193,351 B2
(45) Date of Patent: Nov. 24, 2015

(54) REAL-TIME FUEL CONSUMPTION ESTIMATION

(71) Applicant: FORD GLOBAL TECHNOLOGIES, LLC, Dearborn, MI (US)

(72) Inventors: Yanan Zhao, Ann Arbor, MI (US); Ming Lang Kuang, Canton, MI (US); Anthony Mark Phillips, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 13/960,298

(22) Filed: Aug. 6, 2013

(65) Prior Publication Data

US 2015/0046000 A1   Feb. 12, 2015

(51) Int. Cl.
| | |
|---|---|
| *G06F 17/00* | (2006.01) |
| *G08B 21/00* | (2006.01) |
| *B60W 20/00* | (2006.01) |
| *B60W 10/06* | (2006.01) |
| *B60W 10/08* | (2006.01) |
| *B60K 6/445* | (2007.10) |

(52) U.S. Cl.
CPC .............. *B60W 20/104* (2013.01); *B60K 6/445* (2013.01); *B60W 10/06* (2013.01); *B60W 10/08* (2013.01); *B60W 20/108* (2013.01); *B60Y 2300/52* (2013.01); *Y10S 903/93* (2013.01)

(58) Field of Classification Search
CPC ..... B60W 10/26; B60W 20/00; B60W 10/06; B60W 10/08; B60W 2510/244; B60W 2550/141; B60W 2550/143; B60W 2550/402; B60W 2710/244; B60K 6/46; B60L 11/123; B60L 11/1816; B60L 11/1861; B60L 2210/40

USPC .......... 701/400–541, 22; 340/988–996, 7.32, 340/693.7, 693.2, 636.19, 636.1, 455
See application file for complete search history.

(56) References Cited

U.S. PATENT DOCUMENTS

| | | | |
|---|---|---|---|
| 5,913,917 A | 6/1999 | Murphy | |
| 6,487,477 B1 * | 11/2002 | Woestman et al. | ............. 701/22 |
| 7,369,938 B2 | 5/2008 | Scholl | |
| 2010/0063658 A1 * | 3/2010 | Martin et al. | .................... 701/22 |
| 2010/0106603 A1 * | 4/2010 | Dey et al. | .................. 705/14.63 |

FOREIGN PATENT DOCUMENTS

| | | |
|---|---|---|
| JP | 2007253864 A | 10/2007 |
| JP | 20100095252 A | 4/2010 |

OTHER PUBLICATIONS

Gokasan, Metin; Bogosyan, Seta; Goering, Douglas J.; A Diesel Engine Map Model Based Observer for HEV's; IEEE, Sep. 7-9, 2005, pp. 413-418.

Bogosyan, Seta; Gokasan, Metin; Goering, Douglas J.; A Novel Model Validation and Estimation Approach for Hybrid Serial Electric Vehicles; IEEE Transactions on Vehicular Technology, vol. 56, No. 4, Jul. 2007, pp. 1485-1497.

\* cited by examiner

*Primary Examiner* — Muhammad Shafi
(74) *Attorney, Agent, or Firm* — David B. Kelley; Brooks Kushman P.C.

(57) ABSTRACT

An engine, electric machine and battery of a vehicle are operated, in certain examples, such that a state of charge of the battery is generally maintained while the real-time fuel consumption is estimated and minimized by the use of route segmentation and a predictive average power calculation.

11 Claims, 3 Drawing Sheets

REAL-TIME FUEL CONSUMPTION ESTIMATION

TECHNICAL FIELD

The present disclosure is related to the management of fuel consumption in a hybrid electric vehicle.

BACKGROUND

A Hybrid Electric Vehicle (HEV) operates by buffering fuel energy by using the internal combustion engine to turn a generator; the electricity generated is stored in a battery. HEV systems can also recover kinetic energy by using the momentum of the vehicle to turn the generator; the electricity generated is then stored in a battery. Fuel is the predominate source of energy in an HEV system. Plug-in Electric Hybrid Vehicles (PHEVs) are an extension of existing hybrid electric vehicles (HEVs) with added energy flexibility. A PHEV utilizes a larger capacity battery pack than a standard HEV and the PHEV has two sources of energy, fuel and electricity from the electric utility grid.

An objective of the HEV control system is to minimize energy operational costs and emissions without compromising the vehicle drivability and system constraints. A standard Energy Management Control (EMC) strategy is traditionally designed to operate the HEV in electric drive mode in which the vehicle is operating only the electric motor to maximize the battery power output in blended operation mode, which is when the vehicle is operating both the engine and the electric motor.

SUMMARY

A hybrid electric vehicle may include an engine, an electric machine, a battery, and at least one controller. The at least one controller may operate the engine and electric machine such that a state of charge of the battery is generally maintained while the vehicle control is optimized to minimize the fuel consumption over a predetermined route.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Path forecasting and path information for a given route can be used to optimize fuel economy of a HEV by scheduling the battery State of Charge (SoC) setpoints along the route. One strategy for this optimization can be performed by viewing the overall route, optimizing each point on a route and providing a signal based on the optimized operation to the Powertrain Control Module (PCM).

Figure 1:
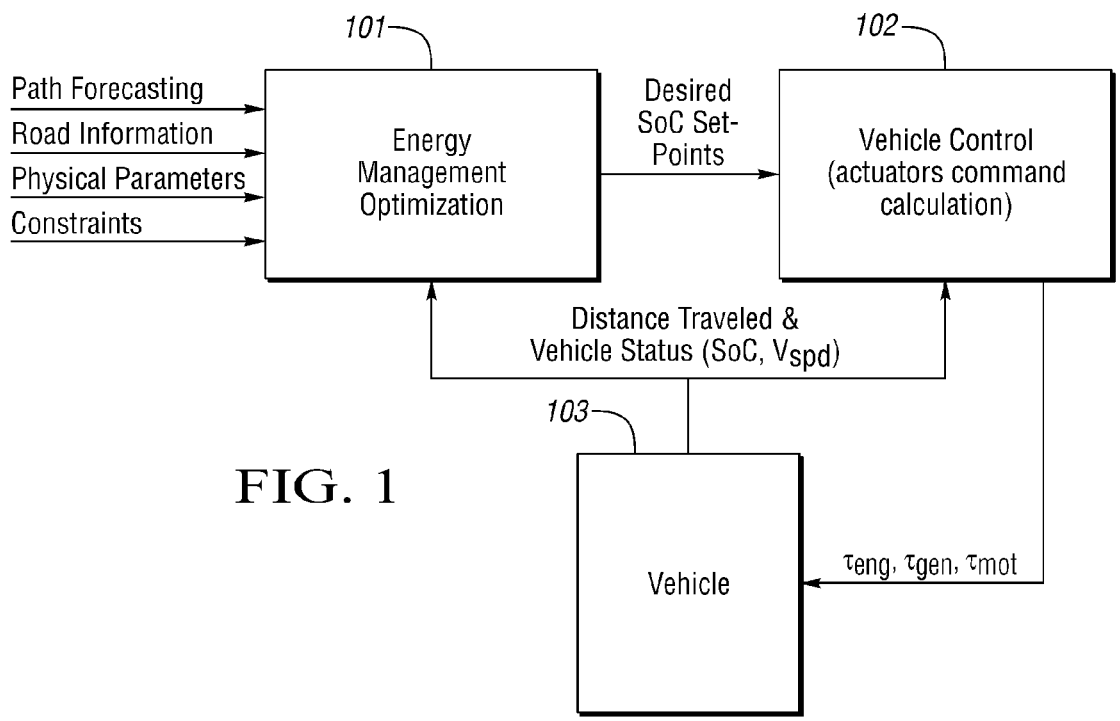
FIG. 1 is a path forecasting based energy management control system flow diagram.

One method of scheduling the battery SoC setpoints along the route is a path dependent receding horizon control for real-time HEV energy management. This allows the system to obtain the optimal battery SoC scheduling by minimizing a cost function which represents the fuel consumption for predicted drive conditions for the intended route. FIG. 1 illustrates one method of decomposing the optimal HEV control problem into two levels. The high level control (Energy Management Optimization 101) determines controls such as the desired setpoints for the battery SoC along the route based on inputs including but not limited to path forecasting, road information, physical parameters, and general system constraints. The low level control (Vehicle Control 102) tracks the battery SoC setpoints and generates the desired vehicle operation parameters (for example battery system power, engine power, rotational engine speed, and engine operation). These intermediate variables allow the Vehicle Control 102 to calculate the torque commands which are sent to the Vehicle 103 and more specifically sent to control the engine and electric machines and provide feedback of the vehicle status resulting in improved fuel economy. The requested torques (engine torque $\tau_{eng}$, generator torque $\tau_{gen}$ and motor torque $\tau_{mot}$) are communicated to the vehicle and the vehicle operation data is fed back to at least the Energy Management Optimization 101 and the Vehicle Control 102. The vehicle operation data includes but is not limited to vehicle speed $V_{spd}$, battery state of charge SoC and distance traveled.

A method to optimize the fuel consumption may require an amount of computation that is greater than the computation bandwidth available in the embedded control module. One method of resolving this computational deficient may be accomplished off-line using a more powerful remote computer system to calculate the optimal operation. It may be desirable to implement this control algorithm real-time. A real-time implementation can include an embedded control module that predicts and processes traffic, road information and driver inputs and collects current vehicle status (battery SoC, vehicle speed, etc.). This real-time implementation collects and processes the data such that the processing is without buffering delays and in which the output is representative and adaptive to the real driving conditions.

For real-time implementation of such an optimization, it may not be practical to determine the SoC setpoint for every moment in time of the route because of the extensive computation requirements. One method of solving this is to divide the route into segments. An example method of dividing the route is to time divide the route based on available computational bandwidth. One problem with this is that it does not account for characteristics of the route. Another example method is to decompose the route into segments that have similar characteristics and attributes. Then, the SoC setpoint can be scheduled for the end point of each segment based on the optimization. The second example of route segmentation shows advantages in generating a real-time fuel consumption estimation method for a given route segment.

Figure 2:
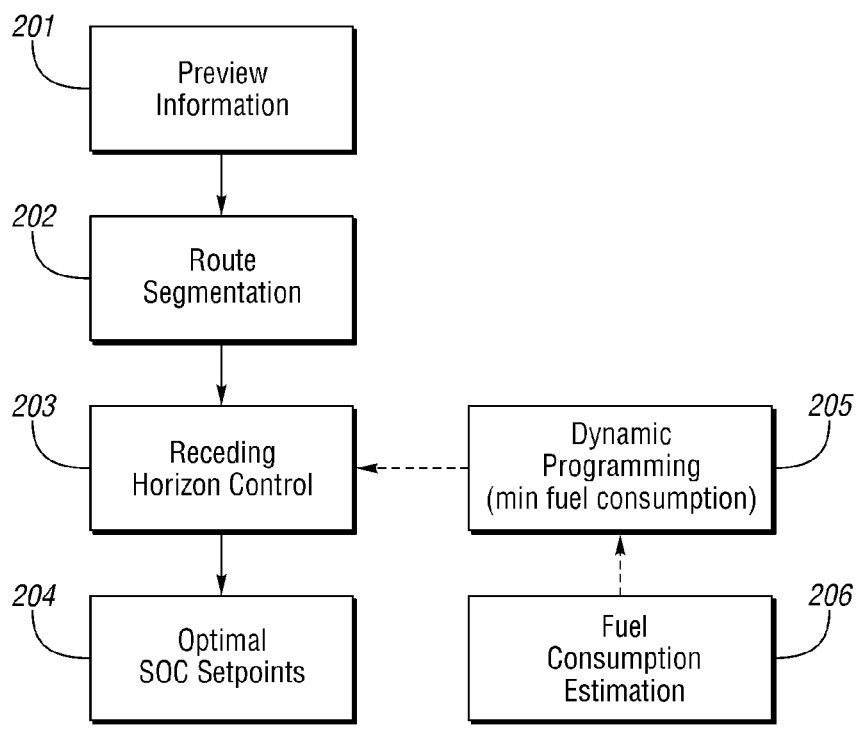
FIG. 2 illustrates a block diagram of a high level control of the energy management control system.

FIG. 2 is the block diagram of a method of the high level control Energy Management Optimization 101. For a given route with preview information 201 available, that preview information 201 may consist of but not be limited to the vehicle speed, posted speed, traffic data, time and road attributes. That preview information 201 is used to calculate route segmentation 202. The route segmentation 202 is performed by decomposing the continuous route into discrete segments. After the route is segmented, the route segmentation 202 information is forwarded to a receding horizon control 203 which also solves a formulated Dynamic Programming (DP) 205 problem which is used to obtain data such as the optimal battery SoC setpoints 204. As the vehicle travels, the receding horizon control 203 is conducted iteratively for the remaining route until the destination is reached. At every iteration, an optimal SoC setpoint 204 for the current segment may be calculated. The nonlinear DP problem can be solved numerically using the state and control variables (FIG. 3, $SoC_1$ and $SoC_2$) which include the battery SoC at the beginning and the end of each route segment. The state and control variables are quantized into finite grid, and the fuel consumptions are calculated at the grid points for each segment.

The calculation of the fuel consumption has multiple unique aspects. One aspect is that the calculation is used to support the real-time DP optimization. For example, in a route with a segment number of n, SoC grid point of m, and with pre-defined initial and final sustaining SoC values, the required number of real-time fuel consumption calculations are $$(n-2)*m^2+2*m$$

In the above equation, an increase of n and m improve the control performance. This control improvement, however, requires increased computation due to the large number of control and scheduling points. A method of fuel consumption estimation with significantly small computational load is shown in FIG. 3 which is used to support the real-time DP application.

The calculation of the fuel consumption in real-time for a route segment with predicted route information, vehicle speed, and possible battery SoC at the beginning and the end of the segment can be an efficient and accurate method. Based on a given future segment's information, this method closely replicates the same pre-developed Energy Management Strategy that determines the engine operating points, feeds the required inputs derived from the given segment's information to predict the engine operating points in the future segment, and calculates the fuel consumption.

The method of fuel consumption estimation may prefer that each segment under study has consistent acceleration and road grade. The fuel consumption calculation prefers that each segment of the route is classified as one of two possible powertrain modes, and there is no transition of the powertrain operating mode within each segment. If the given segment does not satisfy these conditions, re-segmentation of the route needs to be performed before the fuel consumption is estimated.

Figure 3:
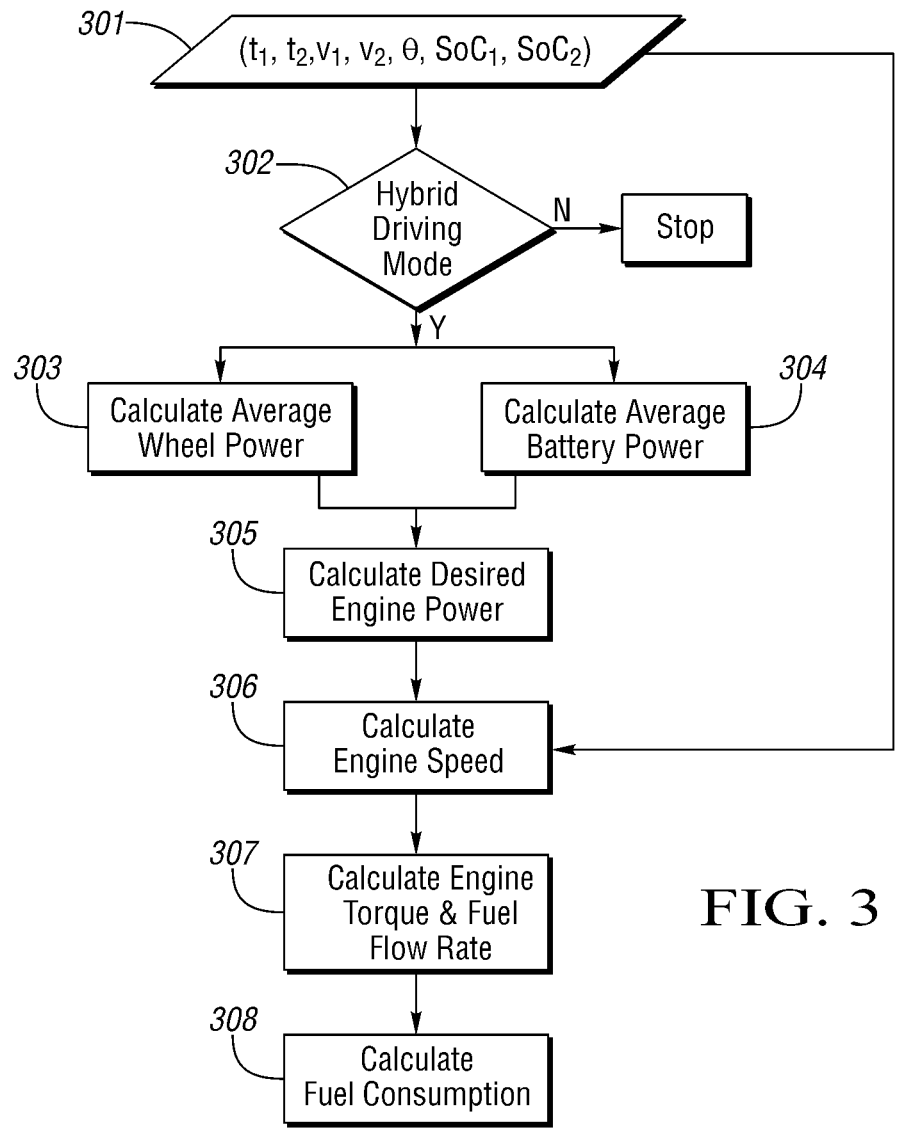
FIG. 3 illustrates a dual average power based fuel consumption calculation flow diagram.

As illustrated in FIG. 3 for a route segment, the inputs 301 to the fuel consumption estimation include but are not limited to $(t_1, t_2, v_1, v_2, \theta, SoC_1, SoC_2)$, where $t_1$ is the time at the beginning of the route segment, $t_2$ is the time at the end of the segment, $v_1$ is the vehicle speed at the beginning of the route segment, $v_2$ is the time at the end of the route segment, $\theta$ is the average road grade of the segment, $SoC_1$ is the battery SoC at the beginning route segment and $SoC_2$ is the battery SoC at the end of the route segment. The battery SoC profile during the segment starting at $SoC_1$ and ending at $SoC_2$ is called the battery charge profile. Based on the preference of the route segment, it is reasonable to assume that each segment has constant vehicle acceleration and linear SoC profile. In the case of a non-linear SoC profile or a quadratic SoC profile, further increasing or decreasing acceleration or a combination of accelerations are predicted, re-segmentation of the route is desired to simplify the average power estimation for each segment.

Fuel consumption estimation of one route segment is based on the given inputs 301 including but not limited to time, velocity, battery state of charge and road characteristics (i.e. map data, road attributes (road grade and road surface), real-time and historic traffic information, driver's past driving history, etc.) The powertrain mode of operation for the segment of the route is then checked in block 302. If the mode of operation is propelled by electric energy only, then the fuel consumption calculation is not performed. If the mode of operation is one in which the vehicle is propelled by a combination of fuel energy and electric energy or fuel energy only, then the algorithm continues to calculate the predicted fuel consumption. The calculation of the average wheel power of predicted driver demand 303 and calculation of the average battery power 304 are performed and combined to calculate the desired engine power.

Average power calculation is performed to provide an estimation of the future wheel power requirement and the possible battery power usage for the route segment. The analytical formulae used to calculate the average wheel power and battery power over each route segment are derived offline based on vehicle dynamics and an equivalent circuit model of the battery.

Based on the inputs and segmentation described above, this approach estimates the average engine power 305 from the average wheel power and average battery power considering the power balance of each route segment. The use of average battery power and average wheel battery power significantly reduces the computational load and allows the calculation to be performed real-time.

An example of a calculation for the average wheel power 303 can be based on a vehicle dynamics model considering aerodynamic drag, road grade, vehicle acceleration, rolling resistance and wheel bearing loss. An example of the analytical formula for average wheel power is below:

$$\text{Ave\_Whl\_Pwr} = \frac{1}{2}\rho C_D A \frac{v_{i+1}^3 + v_{i+1}^2 v_i + v_{i+1} v_i^2 + v_i^3}{4} +$$

$$mg\sin\theta \frac{v_{i+1} + v_i}{2} + \frac{1}{2}\left(m + \frac{4J_{wheel}}{L_{tireRdius}^2}\right)\frac{(v_{i+1}^2 - v_i^2)}{(t_{i+1} - t_i)} +$$

$$r\left(a\frac{v_{i+1} + v_i}{2} + b\frac{v_{i+1}^2 + v_{i+1}v_i + v_i^2}{3} + c\frac{v_{i+1}^3 + v_{i+1}^2 v_i + v_{i+1} v_i^2 + v_i^3}{4}\right) +$$

$$\left(a_{bLoss}\frac{v_{i+1} + v_i}{2} + b_{bLoss}\frac{v_{i+1}^2 + v_{i+1}v_i + v_i^2}{3}\right)$$

in which $$r = 2P_{tire}^\alpha \left(\left(\frac{F_{wgtonFrnWhl}}{2}\right)^\beta + \left(\frac{F_{wgtonRearWhl}}{2}\right)^\beta\right)$$

and $\rho$ is the mass density of the air, $C_D$ is the coefficient of aerodynamic resistance, A is the vehicle frontal area, $v_i$ is the vehicle speed at point i, $v_{i+1}$ is the vehicle speed at point i+1, $t_i$ is the time at point i, $t_{i+1}$ is the time at point i+1, m is the mass of the vehicle, g is the acceleration of gravity, $\theta$ is the road grade, $J_{wheel}$ is the inertia of one wheel, $L_{TireRadius}$ is the radius of the tire, a, b, c are the coefficients for rolling resistance, $a_{bLoss}$, $b_{bLoss}$ are the coefficients for bearing loss, $P_{tire}$ is the tire inflation pressure, $\alpha$ and $\beta$ are the exponents, $F_{wgtonFrnWhl}$ is the weight on the front wheels and $F_{wgtonRearWhl}$ is the weight on the rear wheels. In this equation i can be the start of a segment and i+1 can be the end of a segment.

An example of a calculation for the average battery power 304 can be estimated with the component values of the equivalent circuit model of the battery as shown below:

$$\text{Ave\_Batt\_Pwr} = \left(V_{oc} - RQ\frac{SoC_{i+1} - SoC_i}{t_{i+1} - t_i}\right)Q\frac{SoC_{i+1} - SoC_i}{t_{i+1} - t_i}$$

In which R is the battery internal resistance, $V_{oc}$, is the open circuit voltage, Q is the battery capacity, $SoC_i$ is the battery state of charge at point i, $SoC_{i+1}$ is the battery state of charge at point i+1, $t_i$ is the time at point i, $t_{i+1}$ is the time at point i+1. In this equation i can be the start of a segment and i+1 can be end of a segment.

The average wheel power 303 and average battery power 304 are calculated to obtain the desired engine power 305, which is used to calculate the engine rotational speed 306.

The fuel consumption for the same engine output power can be very different if different engine operating points (speed and torque) are selected. To more accurately estimate the fuel consumption for the given future route segment, the energy management strategy (EMS) is used to predict the engine speed in the segment within the Energy Management Optimization block. One implementation example of the EMS is via the use of a lookup table.

An EMS lookup table can be an offline generated table used to determine engine operating points by maximizing the overall system efficiency given engine power request and vehicle speed. The table generation is an iterative process which considers the efficiency and operation of the engine and electric machine. The engine speed 306 can be determined by the energy management strategy (EMS) table which is the same table used in low level control 102. This selection makes the fuel consumption estimation even closer to the low level control implementation.

Power losses from different sources (motor, generator, differential gear, electric auxiliary, etc.) are considered, and added to the estimated averaged engine power to obtain the engine torque. Calculating engine power, speed and torque can be an iterative process because the power losses and engine operation are dependent. With both engine speed and engine torque, the fuel flow rate can be calculated 307. After, the fuel consumption 308 is calculated by integrating the fuel flow rate from 307.

Figure 4:
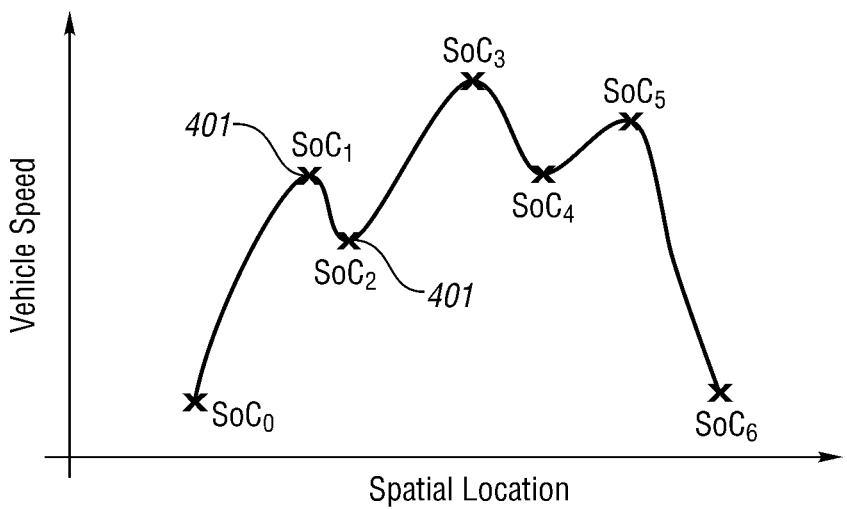
FIG. 4 illustrates an example of a method of segmentation of a predetermined route.

FIG. 4 provides an illustration of a predetermined route that is divided into segments based on vehicle speed inflection criteria and may relate to a segment start or end point 401. This method is used as an example to illustrate that the segmentation may not conform to a spatial or time base but can be determined based on other criteria.

Figure 5:
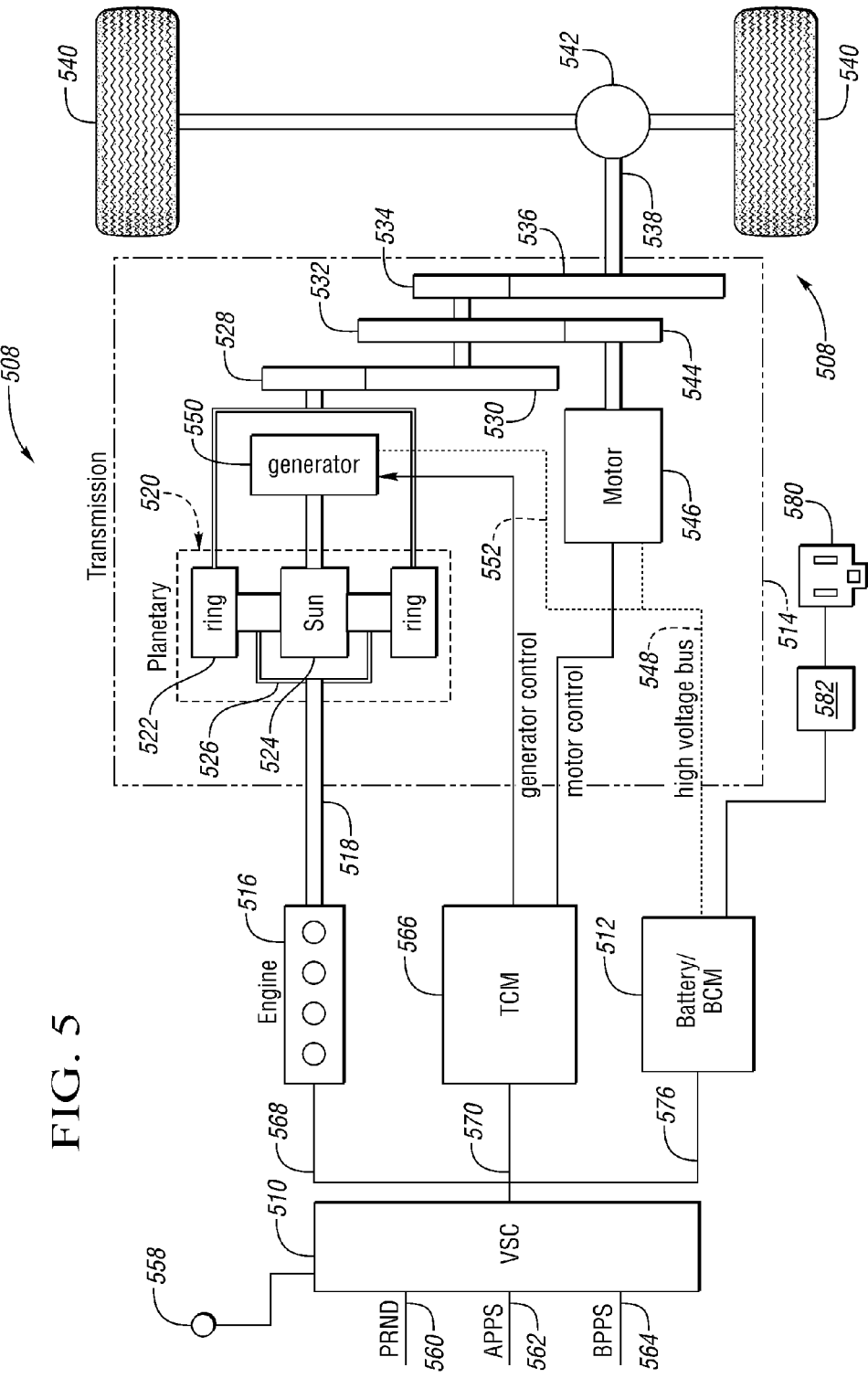
FIG. 5 is a schematic drawing of an example hybrid electric powertrain system configuration.

An example of a hybrid vehicle that can utilize this technology is illustrated but not limited to a power split HEV configuration as illustrated in FIG. 5. This, however, is for example purposes only and not intended to be limiting as the present disclosure applies to PHEVs of any suitable architecture. The control of vehicle 508 can have various configurations. In the example shown in FIG. 5, a vehicle system controller 510 communicates with a battery and battery control module 512, and a control module 566 for a transmission 514. An engine 516, controlled by controller 510, distributes torque through torque input shaft 518 to transmission 514.

The transmission 514 includes a planetary gear unit 520, which comprises a ring gear 522, a sun gear 524, and a planetary carrier assembly 526. The ring gear 522 distributes torque to step ratio gears comprising meshing gear elements 528, 530, 532, 534 and 536. A torque output shaft 538 for the transaxle is drivably connected to vehicle traction wheels 540 through a differential-and-axle mechanism 542.

Gears 530, 532 and 534 are mounted on a countershaft, the gear 532 engaging a motor-driven gear 544. Electric motor 546 drives gear 544, which acts as a torque input for the countershaft gearing.

The battery of module 512 delivers electric power to the motor through power flow path 548. Generator 550 is connected electrically to the battery and to the motor in known fashion, as shown at 552.

In FIG. 5, the vehicle system controller 510 receives input including by not limited to a transmission range selector input signal 560, an accelerator pedal position sensor input signal 562, an brake pedal position sensor input signal 564. The vehicle system controller 510 outputs signals which are connected electrically to the engine 516, a transmission control module 566, and the battery/BCM 512 in a known fashion, as shown at 568, 570, 576. VSC 510 also outputs information to a driver information console 556 to inform the operator of the system operation.

As mentioned previously, there are two power sources for the driveline. The first power source is a combination of the engine and generator subsystems, which are connected together using the planetary gear unit 520. The other power source involves only the electric drive system including the motor, the generator and the battery, wherein the battery acts as an energy storage medium for the generator and the motor.

As mentioned above, a plug-in hybrid electric vehicle (PHEV) is an extension of existing hybrid electric vehicle (HEV) technology, in which an internal combustion engine is supplemented by an electric battery pack and electric machines to further replace fuel with electricity for driving and reduced vehicle emissions. A PHEV utilizes a larger capacity battery pack than a standard hybrid vehicle and adds the capability to recharge the battery from a standard electrical outlet to decrease onboard fuel consumption to further improve the vehicle's fuel economy in the electric driving mode or in the fuel/electricity blended driving mode. Referring to FIG. 5, if HEV 508 is a PHEV, it includes a receptacle 580 which is connected to the power grid or outside electrical source and coupled to battery 512, possibly through a battery charger/converter 582.

To accommodate the path dependent control for real-time HEV energy management presented here, VSC 510 can be extended to optimize fuel consumption by battery SoC setpoint scheduling. Then VSC 510 requires additional inputs 558 which include but not limited to destination of the intended route, road grade, road surface, real-time and historic traffic information, driver's past driving history, predicted vehicle speed, and distance travelled.

Conventional HEVs buffer fuel energy and recover kinematic energy in electric form to improve the overall vehicle system operating efficiency. The fuel is the only energy source. For PHEVs, there is an additional source of energy—the amount of electric energy deposited in the battery from the grid during battery charge events. A power management strategy for PHEVs has the potential to allocate the drive power demand between the two energy sources to achieve better fuel economy or improved drivability while still satisfying the other objectives. While conventional HEVs are operated to maintain the battery state of charge (SOC) around a constant level, PHEVs use as much pre-saved battery electric (grid) energy as possible before the next battery charge event, i.e., it is desirable to fully use the relatively cheap grid supplied electric energy after each plug-in charge event. After the battery SOC depletes to a lowest conservative level, the PHEV operates as a conventional HEV operating about the lowest conservative level for the battery.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hybrid vehicle comprising:
   a battery, an electric machine, and an engine; and
   a controller programmed to, for each of a plurality of vehicle route segments each having consistent acceleration and road grade, and no powertrain operating mode transitions, operate the electric machine and engine according to a battery state of charge setpoint associated with a predicted minimum engine fuel consumption that is based on predicted average wheel and battery power demand for the segment.

2. The vehicle of claim 1, wherein the predicted minimum engine fuel consumption is associated with a particular combination of engine power and electric machine power sufficient to satisfy predicted driver demand for the segment.

3. The vehicle of claim 1, wherein the predicted minimum engine fuel consumption is associated with a predicted engine speed derived from an energy management strategy in energy management optimization and the energy management strategy is used in vehicle control to derive a current engine speed.

4. The vehicle of claim 1, wherein the predicted average wheel power demand is based on a grade profile of the segment.

5. The vehicle of claim 1, wherein the predicted average wheel power demand is based on a predicted vehicle speed for the segment.

6. The vehicle of claim 1, wherein the predicted average battery power demand is based on a state of charge of the battery at a beginning of the segment.

7. The vehicle of claim 1, wherein the predicted average battery power demand is based on a state of charge of the battery at an end of the segment.

8. A hybrid vehicle comprising: a battery;
   an engine;
   an electric machine; and
   at least one controller programmed to, for each of a plurality of segments defining a route for the vehicle, operate the engine and electric machine according to a selected battery state of charge setpoint associated with a minimum of a plurality of predicted fuel consumption values, wherein each of the predicted fuel consumption values is associated with a particular combination of engine power and electric machine power sufficient to satisfy a predicted total power demand wherein the predicted total power demand is based on a predicted average wheel power demand and predicted average battery power demand for the segment, and wherein each of the segments has consistent acceleration and road grade, and no powertrain operating mode transitions.

9. The vehicle of claim 8, wherein the predicted average wheel power demand is based on a grade profile of the segment.

10. The vehicle of claim 8, wherein the predicted average wheel power demand is based on a predicted vehicle speed for the segment.

11. The vehicle of claim 8 further comprising a battery, wherein the predicted average battery power demand is based on a state of charge of the battery at a beginning of the segment and a state of charge of the battery at an end of the segment.

* * * * *